US011482959B2

(12) United States Patent
Tseng et al.

(10) Patent No.: US 11,482,959 B2
(45) Date of Patent: Oct. 25, 2022

(54) MOTOR DRIVING METHOD AND MOTOR DRIVING SYSTEM

(71) Applicant: DELTA ELECTRONICS, INC., Taoyuan (TW)

(72) Inventors: Shao-Kai Tseng, Taoyuan (TW); Yu-Shian Lin, Taoyuan (TW); Yuan-Qi Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/362,932

(22) Filed: Jun. 29, 2021

(65) Prior Publication Data

US 2022/0190760 A1    Jun. 16, 2022

(30) Foreign Application Priority Data

Dec. 10, 2020 (CN) .......................... 202011452049.2

(51) Int. Cl.
*H02P 21/09* (2016.01)
*H02P 21/18* (2016.01)
*H02P 21/20* (2016.01)
*H02P 21/22* (2016.01)

(52) U.S. Cl.
CPC .............. *H02P 21/09* (2016.02); *H02P 21/18* (2016.02); *H02P 21/20* (2016.02); *H02P 21/22* (2016.02); *H02P 2207/055* (2013.01)

(58) Field of Classification Search
CPC .......... H02P 21/09; H02P 21/18; H02P 21/20; H02P 2207/055; H02P 21/22
USPC ............................ 318/400.2, 400.32, 400.15
See application file for complete search history.

(56) References Cited

U.S. PATENT DOCUMENTS

| 2004/0249596 | A1* | 12/2004 | Ho ........................ H02P 21/32 702/106 |
| 2019/0260318 | A1  | 8/2019  | Yamasaki et al. |
| 2020/0007058 | A1* | 1/2020  | Xu ........................ H02P 21/141 |

FOREIGN PATENT DOCUMENTS

| CN | 103875175 | A | * | 6/2014  | .......... H02P 21/0085 |
| CN | 107565872 | A |   | 1/2018  |                        |
| CN | 109546913 | A | * | 3/2019  | ............. H02P 21/05 |
| CN | 110165951 | B | * | 12/2020 |                        |
| JP | 2015180130| A | * | 10/2015 |                        |
| TW | 201425941 | A |   | 7/2014  |                        |
| TW | 202023175 | A |   | 6/2020  |                        |

* cited by examiner

*Primary Examiner* — Jorge L Carrasquillo
(74) *Attorney, Agent, or Firm* — CKC & Partners Co., LLC

(57) ABSTRACT

A motor driving method includes steps of: at an open loop phase and in response to a motor being operated under a steady-state, calculating an angle difference between an estimation coordinate axis of the motor and an actual coordinate axis by a controller, according to an estimation voltage value, an estimation current value and at least one electrical parameter feedback from the motor and in reference with the estimation coordinate axis of the motor; calculating an actual current value in reference with the actual coordinate axis according to the angle difference by the controller; calculating a load torque estimation value associated with the motor according to the actual current value by the controller; and, in response to the open loop phase being switched to a close loop phase, compensating an output torque of the motor according to the load torque estimation value by the controller.

18 Claims, 8 Drawing Sheets

MOTOR DRIVING METHOD AND MOTOR DRIVING SYSTEM

RELATED APPLICATIONS

This application claims priority to China Application Serial Number 202011452049.2, filed Dec. 10, 2020, which is herein incorporated by reference.

BACKGROUND

Field of Invention

The disclosure relates to a motor driving method. More particularly, the disclosure relates to a motor driving method capable of estimating and compensating a load torque.

Description of Related Art

Based on current technologies, in some applications (e.g., elevators) with stepped torque load characteristics, it is required to perform torque estimation and compensation while switching between an open loop phase and a close loop phase, so as to prevent the motor or the electric machine from not providing any output torque while the driving method switching. On the other hand, some conventional methods utilizes a speed controller to adjust an output torque after switching phases, it will cause a dramatic variation of speed on the motor.

SUMMARY

In order to solve aforesaid problems, one embodiment of the disclosure provides a motor driving method which includes: at an open loop phase and in response to a motor being operated under a steady-state, calculating an angle difference between an estimation coordinate axis of the motor and an actual coordinate axis by a controller, according to an estimation voltage value, an estimation current value and at least one electrical parameter feedback from the motor and in reference with the estimation coordinate axis of the motor; calculating an actual current value in reference with the actual coordinate axis according to the angle difference by the controller; calculating a load torque estimation value associated with the motor according to the actual current value by the controller; and, in response to the open loop phase being switched to a close loop phase, compensating an output torque of the motor according to the load torque estimation value by the controller.

The motor driving method provided in the disclosure is able to compensate a load torque of the motor for preventing a dramatic variation of speed caused by switching of the driving method (e.g. switching from an open loop driving into a close loop driving), so as to make the motor system operated smoothly. In addition, because the motor driving method in this disclosure performs the load torque estimation before the switching of the driving method, the motor driving method does not require extra transition time to compensate motor torque while switching, such that a performance of the motor system can be improved.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
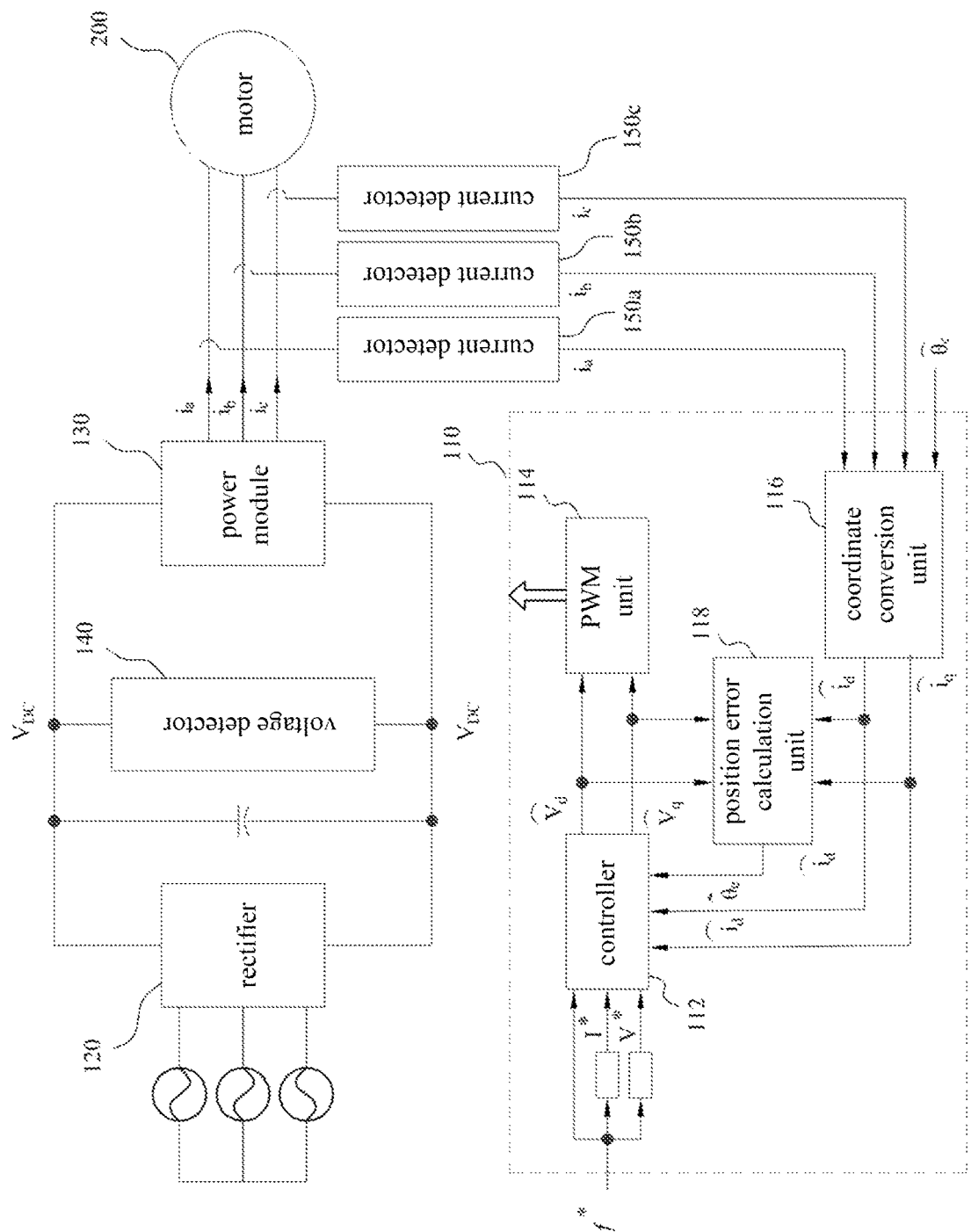
FIG. 1 is a schematic diagram illustrating a motor driving system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a motor driving system 100 according to an embodiment of the disclosure. As shown in FIG. 1, the motor driving system 100 is configured to drive a motor 200, and the motor driving system 100 includes a controller module 110, a rectifier 120, a power module 130, a voltage detector 140 and three-phase current detectors 150a, 150b, 150c. The controller module 110 at least includes a controller 112, a pulse width modulation (PWM) unit 114, a coordinate conversion unit 116, and a position error calculation unit 118. In some embodiments, the controller module 110 is utilized to measure electrical parameters of the motor 200 (such as an inductance value, an angular velocity, a magnetic flux value, etc.), and after calculating an load torque estimation value based on aforesaid information (i.e., the electrical parameters), the controller module 110 transmits the load torque estimation value to the motor 200 to compensate its output torque. In some embodiments, the controller 112 receives a frequency control command from a host computer (not shown) to perform a voltage/frequency control process or a current/frequency control process (detailed later), and the voltage detector 140 is used to receive and detect voltage values feedback from the motor 200 while the motor 200 is operating. The current detectors 150a, 150b, and 150c are utilized to receive and detect current values feedback from the motor 200 while the motor 200 is operating. While the motor drive system 100 is operating, the rectifier 120 receives an external alternating-current (AC) power and converts the external AC power into a direct-current (DC) power, and the rectifier 120 transmits the DC power to the power module 130. In addition, the PWM unit 114 receives a voltage command outputted from the controller 112 and converts it into a switching signal to provide the power module 130 for driving control of the motor 200. The coordinate conversion unit 116 can convert three-phase currents ($i_a$, $i_b$, $i_c$) respectively measured by the current detectors 150a, 150b, and 150c into two-axis current projection values ($\hat{i}_d, \hat{i}_q$) and provide these values to the position error calculation unit 118 and the controller 112 for further calculation.

In detail, in applications of the motor which has load torque characteristics under zero speed condition, the driving method may switch between different manners (for example, switching from an open loop driving into a close loop driving with a sensorless control technique). In this case, it is required to estimate the output torque of the motor so as to perform the torque compensation. In addition, while controlling permanent magnet synchronous motors (or electric machines), in order to achieve characteristics similar to direct current (DC) motors, Park's Transformation can be used to establish a coordinate system on the motor rotor that rotates synchronously with the rotor. The three-phase currents ($i_a$, $i_b$, $i_c$) are converted and represented as a direct axis (d-axis) current and a quadrature axis (q-axis) current. In some embodiments, a direction of the rotor magnetic field is defined as the direct axis (d-axis), and a direction perpendicular to the rotor magnetic field is defined as the quadrature axis (q-axis). Aforesaid coordinate conversion manner will be discussed along with embodiments about FIG. 2.

In applications that the motor 200 is utilized to overcome a step load or an impact load, such as motors in elevators or treadmills, if the aforementioned driving method is switched to the close loop driving, the motor driving system 100 will not acknowledge the step load or the impact load occurring during the open loop phase, and the torque cannot be compensated by the motor driving system 100, such that it eventually causes instability while the motor 200 is operating. Take an application of the elevator as an example, at a moment that a brake of the elevator is released, a step load is applied to the motor 200 at zero speed. In the open loop phase, a larger current is utilized to generate the output torque required in aforesaid example. The method of this disclosure can estimate the load torque at first before the driving method is switched to the close loop phase. When the driving method is switched to the close loop phase, the torque can be compensated immediately to overcome the step load, so that the output torque of the motor 200 in the close loop phase can be consistent with the output torque of the motor 200 in the open loop phase, and the motor 200 driven by the driving method can have the same acceleration before and after the switching, so as to suppress the instability of the motor 200.

Figure 2:
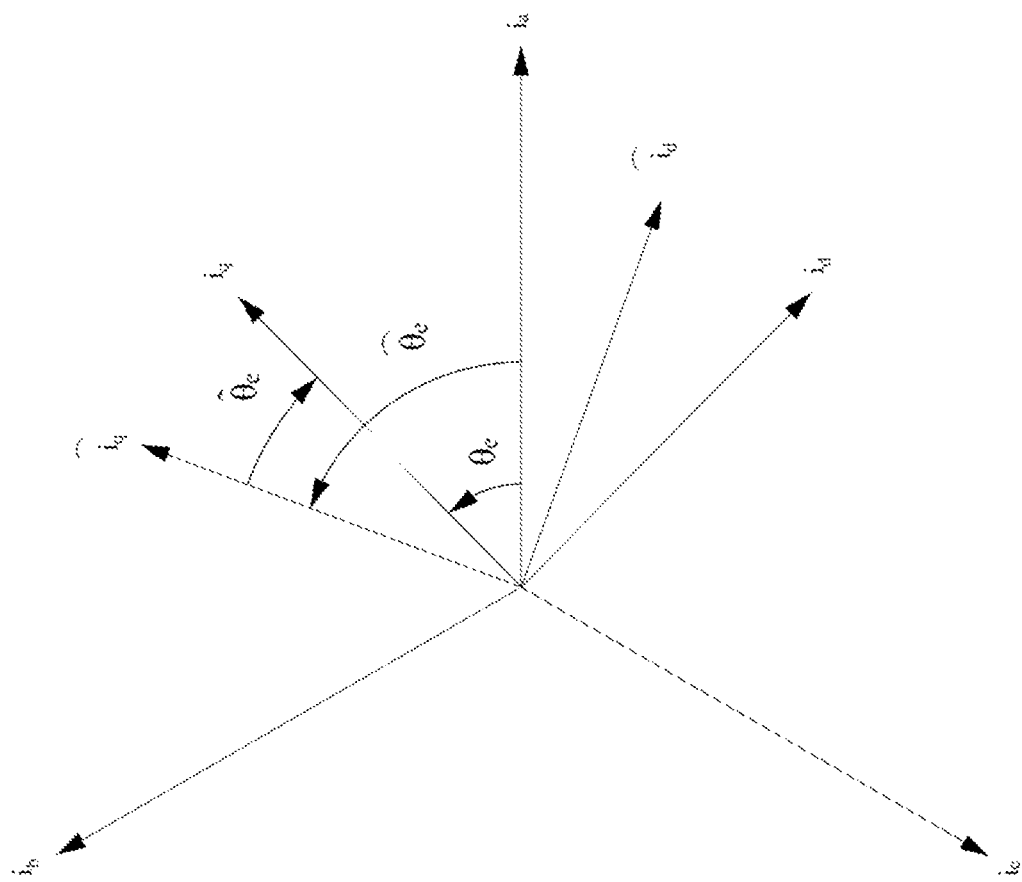
FIG. 2 is a schematic diagram illustrating the coordinate conversion in an embodiment of the disclosure.

FIG. 2 is a schematic diagram illustrating the coordinate conversion in an embodiment of the disclosure. The $i_a$, $i_b$, $i_c$ shown in FIG. 2 represent current components in a, b, and c phases respectively. In some embodiments, $i_d$ is an actual d-axis current value in reference with an actual coordinate axis; $i_q$ is an actual q-axis current value in reference with the actual coordinate axis; $\hat{i}_d$ is an estimation d-axis current value in reference with an estimation coordinate axis, $\hat{i}_q$ is an estimation q-axis current value in reference with the estimation coordinate axis; and, $\tilde{\theta}_e$ is an angle difference between the estimation coordinate axis and the actual coordinate axis. In some embodiments, the aforesaid angle difference $\tilde{\theta}_e$ may be an angle difference between the estimation q-axis current value $\hat{i}_q$ and the actual q-axis current value $i_q$. Based on aforesaid conversion method of projecting the three-phase currents onto the coordinate axis rotating along with the rotor, an analysis to the synchronous motor can be simplified, and it is beneficial to the following description.

Figure 3:
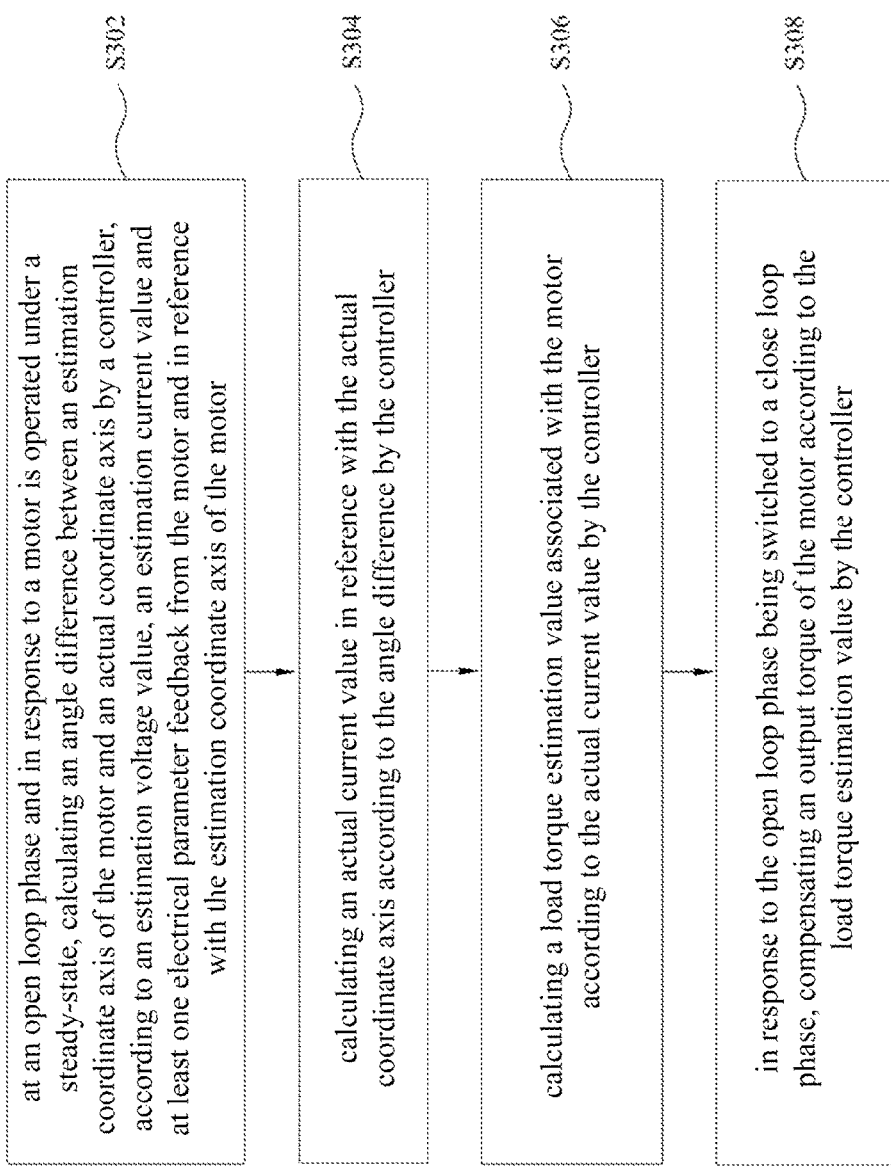
FIG. 3 is a flowchart of a motor driving method according to an embodiment of the disclosure.

FIG. 3 is a flowchart of a motor driving method 300 according to an embodiment of the disclosure. In some embodiments, the motor driving method 300 works along with the motor driving system 100, but it is not limited thereto. For clarity and convenience of description, the following motor driving method 300 is described with reference to the embodiments in FIG. 1 and FIG. 2 for demonstration.

In step S302, in the open loop phase of controlling the motor 200, and the motor 200 is operated under a steady-state, the controller 112 calculates an angle difference $\tilde{\theta}_e$ between an estimation coordinate axis of the motor 200 and an actual coordinate axis, according to an estimation voltage value, an estimation current value and at least one electrical parameter feedback from the motor 200 and in reference with the estimation coordinate axis of the motor 200. When the motor 200 is operated under the open loop phase, an integral value of a speed command is directly used as an estimation rotor position value $\hat{\theta}_e$, regardless of a differential adjustment volume between the actual speed and the speed command. The motor driving method outputs voltage/frequency or current/frequency value as originally planned (without considering the differential adjustment volume between the actual speed and the speed command).

Afterward, in step S304, the controller 112 calculates an actual current value in reference with the actual coordinate axis according to the angle difference $\tilde{\theta}_e$. In some embodiments, as shown in FIG. 1 to FIG. 3, the controller 112 and the position error calculation unit 118 calculates the actual current value of the motor 200 according to the angle difference $\tilde{\theta}_e$ between a direction of the actual q-axis current $i_q$ and another direction of the estimation q-axis current $\hat{i}_q$ converted by the coordinate conversion unit 116 from a stator current signal feedback from the motor 200.

In some embodiments, the angle difference $\tilde{\theta}_e$ can be calculated by the controller 112 based on an estimation current value of the motors 200. In some embodiments, the angle difference $\tilde{\theta}_e$ can be calculated according to an estimation voltage value, an estimation current value, and at least one electrical parameter of the motor 200 through the following derivation process. In some embodiments, an equation about voltages on the permanent magnet synchronous motor can be expressed as:

$$\begin{bmatrix} v_d \\ v_q \end{bmatrix} = \begin{bmatrix} r_s & -\omega_e L_q \\ \omega_e L_d & r_s \end{bmatrix} \begin{bmatrix} i_d \\ i_q \end{bmatrix} + \begin{bmatrix} L_d & 0 \\ 0 & L_q \end{bmatrix} \frac{d}{dt} \begin{bmatrix} i_d \\ i_q \end{bmatrix} + \begin{bmatrix} 0 \\ \omega_e \lambda'_m \end{bmatrix} \quad (1)$$

In the equation (1), $v_d$ represents an actual d-axis voltage value in reference with the actual coordinate axis; $v_q$ represents an actual q-axis voltage value in reference with the actual coordinate axis; $i_d$ represents the actual d-axis current value; and, $i_q$ represents the actual q-axis current value. In addition, the actual d-axis voltage value $v_d$, the actual q-axis voltage value $v_q$, the actual d-axis current value $i_d$ and the actual q-axis current value $i_q$ for driving the motor 200 can be adjusted in different applications. In some embodiments, the electrical parameters of the motor 200 includes, for example, an angular velocity value $\omega_e$, a rotor coil wire resistance $r_s$, a d-axis inductance $L_d$ and a q-axis inductance $L_q$, or a combination of the angular velocity value $\omega_e$, the rotor coil wire resistance $r_s$, a d-axis inductance $L_d$ and an equivalent magnetic flux $\lambda'_m$ from a rotor to a stator of the motor 200. Aforesaid electrical parameters can be transmitted by any data transmitter in the motor 200 to the controller 112 or can be stored into the controller 112 before the motor 200 is turned on. Furthermore, the equation about voltages in the equation (1) is equivalent to:

$$\begin{bmatrix} v_d \\ v_q \end{bmatrix} = \begin{bmatrix} r_s & -\omega_e L_q \\ \omega_e L_q & r_s \end{bmatrix} \begin{bmatrix} i_d \\ i_q \end{bmatrix} + \begin{bmatrix} L_d & 0 \\ 0 & L_q \end{bmatrix} \frac{d}{dt} \begin{bmatrix} i_d \\ i_q \end{bmatrix} + \omega_e \begin{bmatrix} 0 \\ \lambda'_m + (L_d - L_q) i_d \end{bmatrix} \quad (2)$$

Reference is made to FIG. 2. In order to perform the conversions between the actual current value and the estimation current value and between the actual voltage value and the estimation voltage value, the following conversion matrix $$\begin{bmatrix} \cos\tilde{\theta}_e & -\sin\tilde{\theta}_e \\ \sin\tilde{\theta}_e & \cos\tilde{\theta}_e \end{bmatrix}$$

can be applied to represent the actual voltage value and the actual current value on the d-axis and the q-axis as:

$$\begin{bmatrix} i_d \\ i_q \end{bmatrix} = \begin{bmatrix} \cos\tilde{\theta}_e & -\sin\tilde{\theta}_e \\ \sin\tilde{\theta}_e & \cos\tilde{\theta}_e \end{bmatrix} \begin{bmatrix} \hat{i}_d \\ \hat{i}_q \end{bmatrix} \quad (3)$$

$$\begin{bmatrix} v_d \\ v_q \end{bmatrix} = \begin{bmatrix} \cos\tilde{\theta}_e & -\sin\tilde{\theta}_e \\ \sin\tilde{\theta}_e & \cos\tilde{\theta}_e \end{bmatrix} \begin{bmatrix} \hat{v}_d \\ \hat{v}_q \end{bmatrix} \quad (4)$$

In order to facilitate the calculation, the conversion matrix can be simplified and represented by $T(\tilde{\theta})$, and the equations (3) and (4) are simplified as:

$$\begin{bmatrix} i_d \\ i_q \end{bmatrix} = T(\tilde{\theta}) \begin{bmatrix} \hat{i}_d \\ \hat{i}_q \end{bmatrix} \quad (3')$$

$$\begin{bmatrix} V_d \\ V_q \end{bmatrix} = T(\tilde{\theta}) \begin{bmatrix} \hat{v}_d \\ \hat{v}_q \end{bmatrix} \quad (4')$$

Then, when the motor 200 is operating in a steady state, there is a characteristic that $$\frac{d}{dt} \begin{bmatrix} i_d \\ i_q \end{bmatrix} = 0.$$

This characteristic and the formulas (3') and (4') can be combined into the formula (2) to simplify the inductance and voltage drop parameters in aforesaid voltage equation including the angle difference $\tilde{\theta}_e$, and the amended equation can be expressed as:

$$T(\tilde{\theta}) \begin{bmatrix} \hat{v}_d \\ \hat{v}_q \end{bmatrix} = \begin{bmatrix} r_s & -\omega_e L_q \\ \omega_e L_q & r_s \end{bmatrix} T(\tilde{\theta}) \begin{bmatrix} \hat{i}_d \\ \hat{i}_q \end{bmatrix} + \begin{bmatrix} 0 \\ \omega_e(\lambda'_m + (L_d - L_q) i_d) \end{bmatrix} \quad (5)$$

Components in the equation (5) are sorted and expanded in reference with the conversion matrix $$\text{into:} \begin{bmatrix} \hat{v}_d \\ \hat{v}_q \end{bmatrix} = T^{-1}(\tilde{\theta}) \begin{bmatrix} r_s & -\omega_e L_q \\ \omega_e L_q & r_s \end{bmatrix} T(\tilde{\theta}) \begin{bmatrix} \hat{i}_d \\ \hat{i}_q \end{bmatrix} + \quad (6)$$
$$T^{-1}(\tilde{\theta}) \begin{bmatrix} 0 \\ \omega_e(\lambda'_m + (L_d - L_q) i_d) \end{bmatrix}$$
$$= \begin{bmatrix} r_s & -\omega_e L_q \\ \omega_e L_q & r_s \end{bmatrix} \begin{bmatrix} \hat{i}_d \\ \hat{i}_q \end{bmatrix} + \omega_e(\lambda'_m + (L_d - L_q) i_d) \begin{bmatrix} \sin\tilde{\theta}_e \\ \cos\tilde{\theta}_e \end{bmatrix}$$

According to aforesaid formula (6), the angle difference $\tilde{\theta}_e$ between the actual coordinate axis and the estimation coordinate axis can be determined by the estimation voltage values (including the components on the estimation coordinate axis, that is, the estimation d-axis voltage value $\hat{v}_d$ on the estimation coordinate axis and the estimation q-axis voltage value $\hat{v}_q$ on the estimation coordinate axis), the estimation current values (including the components on the coordinate axis, that is, the estimation d-axis current value and the estimation q-axis current value) and the above electrical parameters required in the formula (1). Trigonometric function values related to the angle difference $\tilde{\theta}_e$ can be expressed as:

$$\begin{bmatrix} \sin\tilde{\theta}_e \\ \cos\tilde{\theta}_e \end{bmatrix} = \frac{1}{\omega_e(\lambda'_m + (L_d - L_q) i_d)} \left\{ \begin{bmatrix} \hat{v}_d \\ \hat{v}_q \end{bmatrix} - \begin{bmatrix} r_s & -\omega_e L_q \\ \omega_e L_q & r_s \end{bmatrix} \begin{bmatrix} \hat{i}_d \\ \hat{i}_q \end{bmatrix} \right\} \quad (7)$$

In addition, aforesaid equation (7) can be sorted into another equation about the angle difference $\tilde{\theta}_e$ as below:

$$\tilde{\theta}_e = \tan^{-1} \left( \frac{\hat{v}_d - r_s \hat{i}_d + \omega_e L_q \hat{i}_q}{\hat{v}_q - r_s \hat{i}_q - \omega_e L_q \hat{i}_d} \right) \quad (7a)$$

In step S306, the controller 112 calculates an estimation load torque of the motor 200 according to the actual current value calculated above. In some embodiments, since the actual d-axis current value $i_d$ is usually controlled to be zero while designing related parameters of the permanent magnet electric motor, the calculation of the estimation load torque of the motor 200 is simplified into being only relative to the actual q-axis current value $i_q$. In other words, in some embodiments, when the actual d-axis current value $i_d$ is controlled to zero, the estimation torque equation of the permanent magnet electric motor can be simplified as follows:

$$T_e = \frac{3}{2} \frac{P}{2} i_q \lambda'_m = K_t i_q \quad (8)$$

Therefore, in some embodiments, as shown in FIG. 1 to FIG. 3, it is required to apply a conversion relationship (e.g., an equation (9) shown below) between the actual q-axis current value $i_q$, the estimation d-axis current value $\hat{i}_d$ and the estimation q-axis current value $\hat{i}_q$ into the equation (8), such that the controller 112 can calculate the load torque estimation value $T_e$ (such as the equation (10) below), in which $\lambda'_m$ is an equivalent magnetic flux from the rotor to the stator, P is the number of poles of the motor 200.

$$i_q = \hat{i}_d \sin\tilde{\theta}_e + \hat{i}_c \cos\tilde{\theta}_e \quad (9)$$

$$T_e = \left(\frac{3}{2}\frac{P}{2}\lambda'm\right)(\hat{i}_d \sin\tilde{\theta}_e + \hat{i}_c \cos\tilde{\theta}_e) \quad (10)$$

After calculating the load torque estimation value $T_e$ of the motor 200, in step S308, when the motor 200 is switched from the open-loop phase into the close loop phase, the controller 112 can compensates the output torque of the motor 200 according to the load torque estimation value $T_e$ calculated above. In some embodiments, as shown in FIG. 1 to FIG. 3, the controller 112 can compensate the original output torque of the motor 200 based on the load torque estimation value $T_e$ calculated in aforesaid process.

In some embodiments, the motor 200 under the close loop phase is controlled in reference with the rotor positions and corresponding speeds, and the current close loop control is achieved by performing coordinate axis conversion on the estimation rotor position. On the other hand, the speed estimation result is compared with the speed command to adjust the current command for close loop speed controlling. A common sensorless control technology uses back-electromotive force (back-EMF) as a parameter for estimating the rotor position. Since the back-EMF and the speed of the motor 200 are proportional to each other, in practices, it is required to ensure that the motor 200 operates above a certain rotational speed threshold, such that the back-EMF signal can be captured successfully. Therefore, in order to determine the time point when the driving method is switched from the open loop phase into the closed loop phase, the current speed command f* can be compared with a speed command threshold $\omega_{th}$. In other words, when the controller 112 detects that the current speed command f* exceeds the speed command threshold $\omega_{th}$, the controller 112 starts to switch the drive control method on the motor 200, and the switching will be described later.

In some embodiments, aforesaid steps S302 to S304 may be repeated multiple times to calculate and obtain plural actual current values, and aforesaid step S306 may be repeated multiple times to calculate and obtain plural load torque estimation values $T_e$. When the output torque of the motor 200 is compensated in step S308, it may consider the values $T_e$ varied in multiple calculations. When the load torque estimation values are too large or too small, these extreme load torque estimation values $T_e$ may affect the estimation rotational speed. Therefore, an average value can be calculated from the obtained actual current values, and the average value of the actual current values can be used to calculate the load torque estimation value $T_e$ as the compensation amount of the output torque of the motor 200 in step S308, and it will be described later.

Based on aforesaid embodiments, the controller 112 is able to calculate the load torque estimation value $T_e$ in advance, when the motor 200 is still operating in the open loop phase. When the motor 200 is switched from the open loop phase into the close loop phase, the load torque estimation value calculated in advance is utilized to compensate the output torque of the motor 200, such that the motor 200 is able to keep running smoothly while the drive control phase is switching.

Figure 4A:
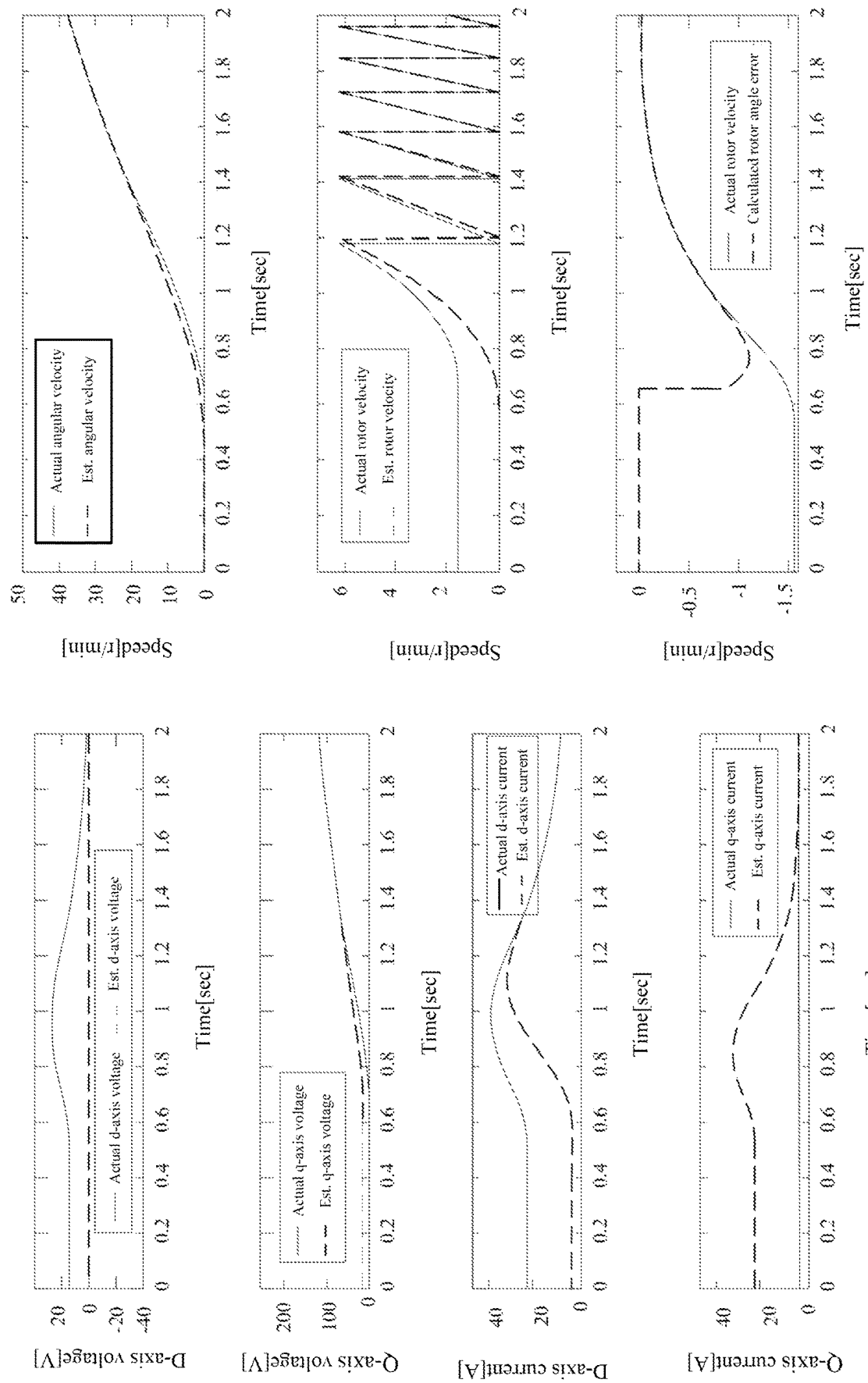
FIG. 4A is a schematic diagram illustrating experimental data of voltage/frequency (V/f) control manner according to an embodiment of the disclosure.

In some embodiments, the motor driving method in the open loop phase can be controlled by the controller 112 in a voltage/frequency controlling manner (V/f control) or a current/frequency controlling manner (I/f control). As shown in FIG. 4A, which is a schematic diagram illustrating experimental data of voltage/frequency (V/f) control manner according to an embodiment of the disclosure. In some embodiments, one of the estimation d-axis voltage value $\hat{v}_d$ and the estimation q-axis voltage value $\hat{v}_q$ can be set to be zero, and the controller 112 is able to obtain the estimation d-axis current value $\hat{i}_d$ and the estimation q-axis current value $\hat{i}_q$ by configuring the other one of the estimation d-axis voltage value $\hat{v}_d$ and the estimation q-axis voltage value $\hat{v}_q$ at certain values. For example, in some embodiments, the voltage/frequency (V/f) control manner as shown in FIG. 4A utilizes the controller 112 to adjust the estimation q-axis voltage value $\hat{v}_q$ according to a desired rotational speed, and the estimation d-axis voltage value $\hat{v}_d$ is controlled to be zero. The estimation q-axis current value $\hat{i}_q$ and the estimation d-axis current value $\hat{i}_d$ can be obtained through feedback from the motor 200. As shown in FIG. 4A, the simulated data starts to calculate the rotor angle error at about 0.66 second and gradually approaches to the actual rotor angle error. The rotor angle error by calculation and the actual rotor angle error are similar to each other at about 0.8 second and these two curves roughly overlap at about 0.9 second. It indicates that the estimation method in this disclosure is accurate and fast. In different embodiments, the controller 112 can also adjust the estimation d-axis voltage value $\hat{v}_d$ of the motor 200 according to the desired rotation speed, and set the estimation q-axis voltage value $\hat{v}_q$ to zero, and obtain the estimation q-axis current value $\hat{i}_q$ and the estimation d-axis current value $\hat{i}_d$ through feedback from the motor 200.

In some embodiments, aforesaid motor 200 can be an interior permanent magnet (IPM) motor, a surface permanent magnet (SPM) motor or any other motor requiring compensation to its load torque, and the disclosure is not limited thereto.

Figure 4B:
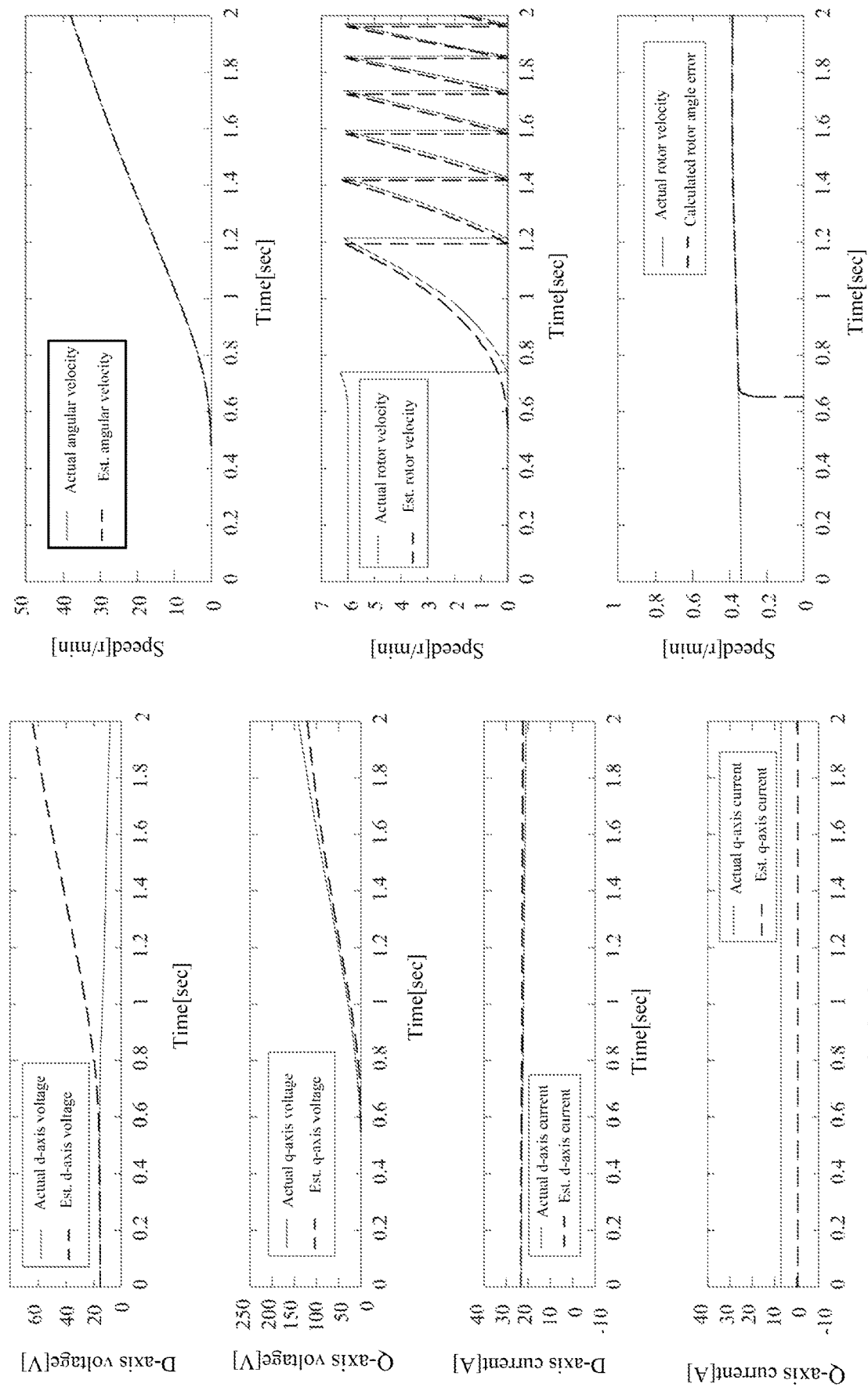
FIG. 4B is a schematic diagram illustrating experimental data in a current/frequency (I/f) control manner according to an embodiment of the present disclosure.

In some embodiments, the current/frequency controlling (I/f control) manner is configured to adjusts the estimation q-axis voltage value $\hat{v}_q$ and the estimation d-axis voltage value $\hat{v}_d$ by the controller 112. One of the estimation q-axis current value $\hat{i}_q$ and the estimation d-axis current value $\hat{i}_d$ is configured to be zero and the other one of the estimation q-axis current value $\hat{i}_q$ and the estimation d-axis current value $\hat{i}_d$ is a predetermined target value (not zero). As shown in FIG. 4B, which is a schematic diagram illustrating experimental data in a current/frequency controlling (I/f control) manner according to an embodiment of the present disclosure. An embodiment of the present disclosure adopts the current/frequency controlling (I/f control) manner to estimate the estimation q-axis voltage value $\hat{v}_q$ and the estimation d-axis voltage value $\hat{v}_d$. The estimation q-axis current value $\hat{i}_q$ is set to be zero, and the estimation d-axis current value $\hat{i}_d$ is set to be about 20 Amperes, and the angle difference $\tilde{\theta}_e$ is calculated with this information. As the simulated data shown in FIG. 4B, the rotor angle error approaches to the actual rotor angle error at about 0.66 second. Two curves of the rotor angle error by calculation and the actual rotor angle error roughly overlap with each other afterward. It indicates that the estimation method in this disclosure is accurate and fast. For example, in the application of an interior permanent magnet (IPM) motor with the current/frequency controlling (I/f control) manner, the estimation q-axis current value $\hat{i}_q$ is zero, and the estimation d-axis current value $\hat{i}_d$ can be set as a predetermined target value (not zero), such that the equation (7) above can be expressed as:

$$\begin{bmatrix}\sin\tilde{\theta}_e \\ \cos\tilde{\theta}_e\end{bmatrix} = \frac{1}{\omega_e(\lambda'_m + (L_d - L_q)\hat{i}_d)}\begin{bmatrix}\hat{v}_d - r_s\hat{i}_d \\ \hat{v}_q - \omega_e L_q \hat{i}_d\end{bmatrix} \quad (11)$$

Therefore, the angle difference is expressed as:

$$\tilde{\theta}_e = \tan^{-1}\left(\frac{\hat{v}_d - r_s \hat{i}_d}{\hat{v}_q - \omega_e L_q \hat{i}_d}\right) \quad (12)$$

The equation (12) can be applied to the equation (9) to obtain the actual q-axis current value $i_q$:

$$i_q = \hat{i}_s \sin\left[\tan^{-1}\left(\frac{\hat{v}_d - r_s \hat{i}_d}{\hat{v}_q - \omega_e L_q \hat{i}_d}\right)\right] \quad (13)$$

In another example, in the application of surface permanent magnet (SPM) motor with current/frequency controlling (I/f control) manner, the estimation q-axis current value $\hat{i}_q$ is set to be zero. Due to the characteristics of this type of motor, a d-axis inductance $L_d$ of the motor will be equal to a q-axis inductance $L_q$ of the motor, such that the equation (7) above can be simplified as:

$$\begin{bmatrix} \sin\tilde{\theta}_e \\ \cos\tilde{\theta}_e \end{bmatrix} = \frac{1}{\omega_e \lambda'_m} \begin{bmatrix} \hat{v}_d - r_s \hat{i}_d \\ \hat{v}_q - \omega_e L_q \hat{i}_d \end{bmatrix} \quad (14)$$

It is obtained that, $$\sin\tilde{\theta}_e = \frac{\hat{v}_d - r_s \hat{i}_d}{\omega \lambda' m} \quad (15)$$

By substituting the above equation (15) into the equation (9), the actual q-axis current value $i_q$ can be obtained as:

$$i_q = \hat{i}_s \times \frac{\hat{v}_d - r_s \hat{i}_d}{\omega \lambda' m} \quad (16)$$

For another example, in applications of built-in permanent magnet (IPM) motors or surface permanent magnet (SPM) motors with voltage/frequency controlling (V/f control) manner, the estimation quadrature axis current value $\hat{i}_q$ is not zero, such that this value must be considered in combination. The calculation method for this value is the same as aforesaid embodiment. It is similar that, the angle difference $\tilde{\theta}_e$ is calculated in aforesaid equation (7) and then applied into aforesaid equation (9) to calculate the actual q-axis current value $i_q$, which is then multiplied by other constants shown in aforesaid equation (10) to calculate the load torque estimation value $T_e$. For simplicity, the detailed process will not be repeated here in following paragraphs.

Figure 5A:
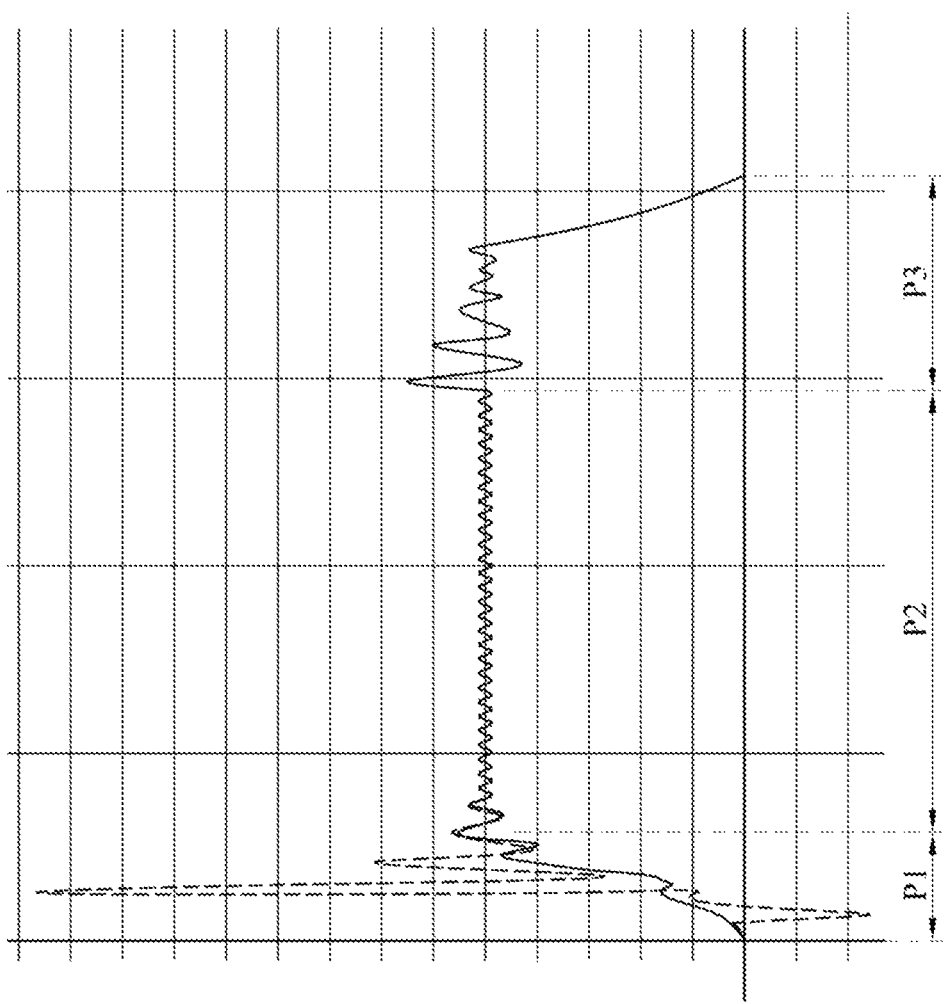
FIG. 5A is an experimental simulation diagram illustrating an embodiment of the present disclosure.

Please refer to FIG. 5A. FIG. 5A is an experimental simulation diagram illustrating an embodiment of the present disclosure. A dotted line shown in FIG. 5A is an operation curve of the motor before torque compensation, and a solid line is an operation curve of the motor controlled by the motor driving method 300 provided in the present disclosure. As shown in FIG. 5A, in the first stage P1 of the motor drive control based on the time axis, the motor is initially driven and controlled in an open loop mode (for example, current/frequency control method), and then at a proper timing the motor is switched into a close loop (e.g., sensorless) drive control; when in the second stage P2, the motor is driven and controlled in the close loop drive control without a shaft detection unit, and the motor is operated at the highest target speed; and, in the third stage P3, the motor is in an unloaded state (without any load). It is noted that in the first stage P1 of switching process in the driving method, if the existing method does not estimate and compensate the speed as indicated by the dotted line, it will cause drastic variations in the speed of the motor; on the contrary, the motor driving method 300 in this disclosure can utilize the information provided by this disclosure, as shown in the solid line, to adjust the speed of the motor in a relatively smooth and stable manner, and more details are described in the embodiment shown in FIG. 5B below.

Figure 5B:
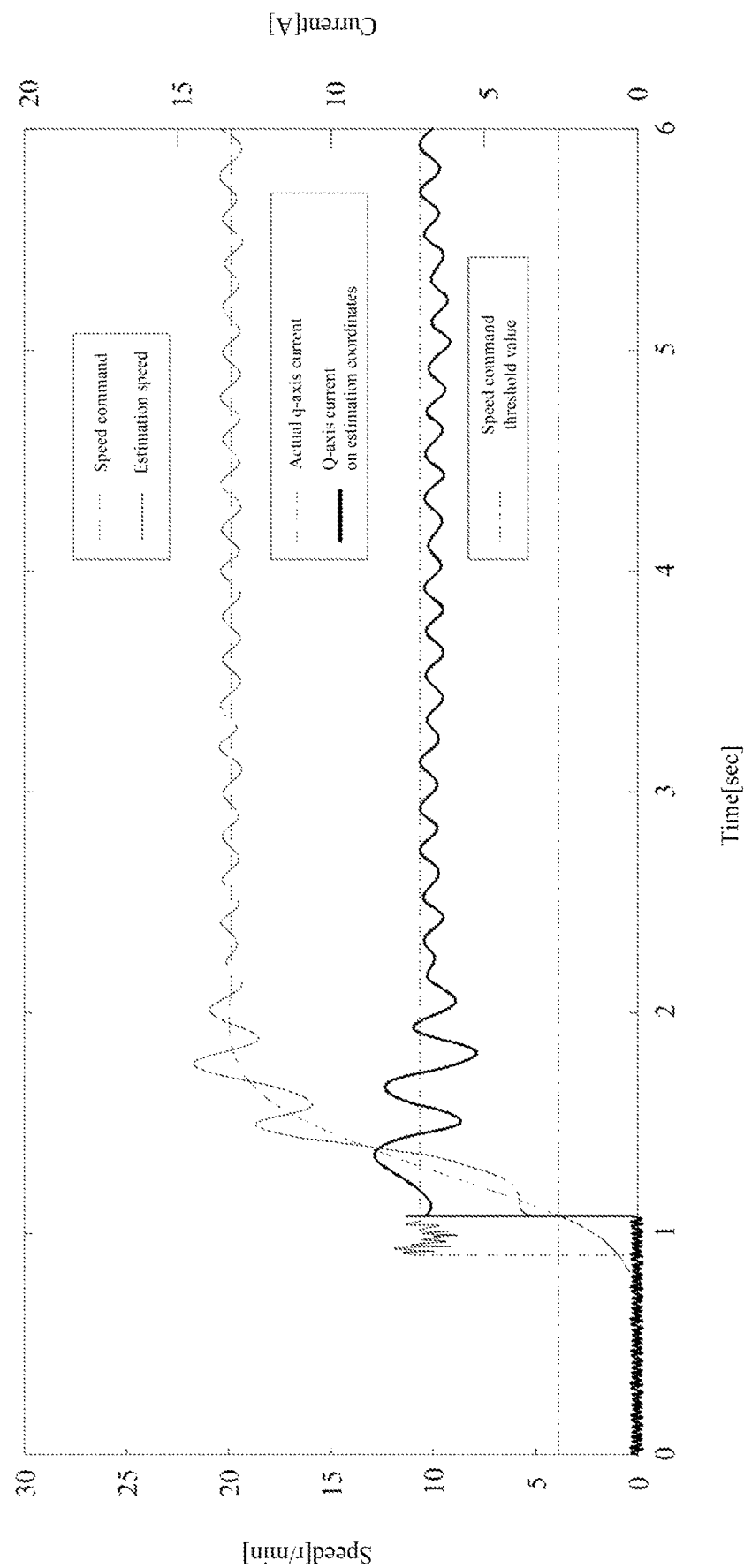
FIG. 5B is a schematic diagram illustrating an experimental simulation of the first stage in FIG. 5A according to an embodiment of the disclosure.

FIG. 5B is a schematic diagram illustrating an experimental simulation of the first stage P1 in FIG. 5A according to an embodiment of the disclosure. As shown in FIG. 5B, at the moment (at about 1.06 second) when the current/frequency controlling method (I/f control, as the open loop drive control described above) is switched to the sensorless controlling method (as the close loop drive control described above), the actual q-axis current value $i_q$ can be calculated based on the aforementioned estimation q-axis current value $\hat{i}_q$, and then the load torque estimation value $T_e$ can be calculated based on the obtained actual q-axis current value $i_q$, and the drive control method performs the torque compensation at the moment or before the switching from open loop to closed loop in a way of the feed forward control, thereby it can suppress the instability caused through the switching of the drive method.

Figure 5C:
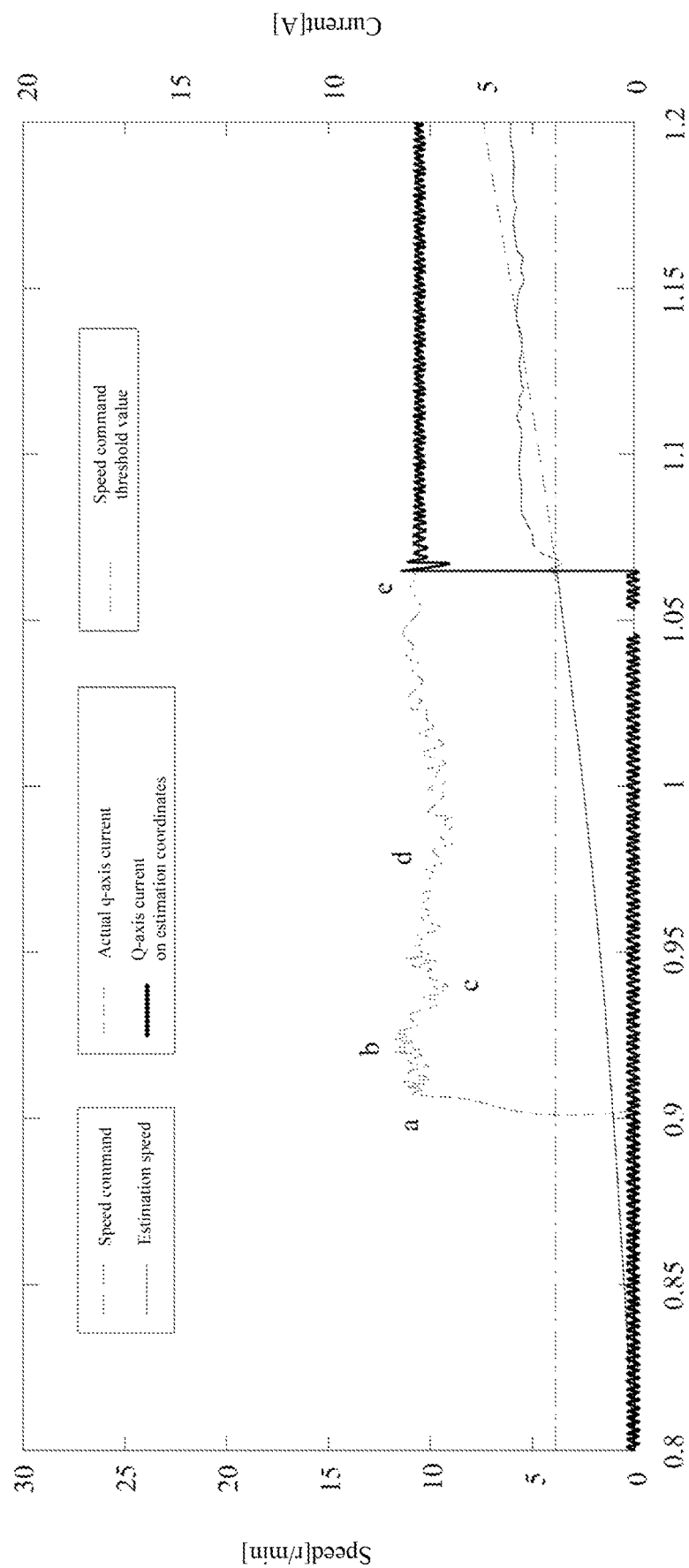
FIG. 5C is a schematic diagram illustrating an experimental simulation from 0.8 second to 1.2 second in FIG. 5B according to an embodiment of the disclosure.

In order to determine a switching time of the driving method of the motor, a speed command threshold value $\omega_{th}$ can be used as a standard for example. In this embodiment, the speed command threshold value $\omega_{th}$ is 4 r/min. When the speed command exceeds this threshold value $\omega_{th}$, the motor 200 is determined as rotating fast enough to successfully capture the back-EMF signal. In some embodiments of the disclosure, the speed command threshold $\omega_{th}$ may be 5% to 10% of a rated speed of the motor 200. As shown in FIG. 5B, as the motor operating over time, when the speed command $f_*$ exceeds the speed command threshold value $\omega_{th}$, at about 0.9 second, the controller 112 triggers the switching of the driving method of the motor 200. FIG. 5C also illustrates that multiple estimation processes are performed from about 0.9 second to 1.06 second to obtain multiple load torque estimation values $T_e$. Therefore, the controller 112 can obtain an average value from these load torque estimation values $T_e$, and utilizes the average value as a compensation value of the output torque of the motor 200, so as to avoid one extreme load torque estimation value (too large or too small) in a single calculation from affecting the following compensations and to reduce a gap between the estimation speed and the speed command, and it can avoid the instability (if the estimation speeds are oscillating between every rounds of calculations for the load torque estimation values). As shown in FIG. 5B, there are still several estimated speed corrections after the switching at about 1.06 seconds, but the motor 200 are running smoothly after 2 second, and the estimation speed at this time is very close to the speed command.

FIG. 5C is a schematic diagram illustrating an experimental simulation from 0.8 second to 1.2 second in FIG. 5B according to an embodiment of the disclosure. As shown in FIG. 5C, the motor driving system 100 in an embodiment of the disclosure starts estimating at the estimation point "a" at about 0.9 second, and the actual q-axis current value $i_q$ obtained based on aforementioned steps S302 to S304 is about 7.22 A, and then the method continues to obtain multiple estimation points "b", "c", "d" and "e" over time axis and are reflected in following Table 1. As shown in Table 1, the actual q-axis current values $i_q$ are obtained by calculations in multiple rounds. Among these estimation points, the estimation point "b" corresponds to the maximum value obtained during the estimation time; the estimation point "c" corresponds to the minimum value obtained during the estimation time; the estimation point "d" is a sampled point close to the average value during the estimation period; and the estimation point "e" is the last estimation executed before switching. The average value of these estimation points is sampled within a time interval between 0.91 second to 1.06 second by simulation analysis, and an average of the actual q-axis current values $i_q$ obtained by estimation every 1 microsecond is about 6.69 A.

TABLE 1

| | estimation point | | | | |
|---|---|---|---|---|---|
| | a | b | c | d | e |
| time (second) | 0.91 | 0.92 | 0.94 | 0.97 | 1.06 |
| current value (ampere) | 7.22 | 7.86 | 6.03 | 6.69 | 7.27 |
| difference from the average (%) | +7.9 | +17.5 | −10.9 | 0 | +8.7 |

In some embodiments, aforesaid estimation time can be estimated in proportion to the speed command value of the motor 200 and the rated speed of the motor 200. As shown in FIG. 5C, the simulation data of the motor driving system 100 performs the estimation of the actual q-axis current value $i_q$ in a time interval that the speed command f* reaches 1 r/min to 4 r/min. The time interval for estimation is, for example, a time period that the speed command corresponds to 1% to 10% of the rated speed of the motor 200. In order to avoid that the aforesaid estimation value is too large or too small to affect the subsequent calculation of the load torque estimation value $T_e$, the average value of the aforesaid estimation period (that is 6.69 A in aforesaid embodiments) or the value of the last estimation point immediately before switching (that is 7.27 A on the estimation point "e") is applied into the equation (10) to calculate the estimated load torque value $T_e$.

Based on embodiments above, the motor driving method provided in the disclosure is able to compensate a load torque of the motor for preventing a dramatic variation of speed caused by switching of the driving method (e.g. switching from an open loop driving into a close loop driving), so as to make the motor system operates smoothly. In addition, because the motor driving method in this disclosure performs the load torque estimation before the switching of the driving method, the motor driving method does not require extra transition time to compensate motor torque while switching, such that a performance of the motor system can be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor driving method, comprising:
at an open loop phase and in response to a motor being operated under a steady-state, calculating an angle difference between an estimation coordinate axis of the motor and an actual coordinate axis by a controller, according to an estimation voltage value, an estimation current value and at least one electrical parameter feedback from the motor and in reference with the estimation coordinate axis of the motor;
calculating an actual current value in reference with the actual coordinate axis according to the angle difference by the controller;
calculating a load torque estimation value associated with the motor according to the actual current value by the controller; and
in response to the open loop phase being switched to a close loop phase, compensating an output torque of the motor according to the load torque estimation value by the controller,
wherein the angle difference is represented as:

$$\tilde{\theta}_e = \tan^{-1}\left(\frac{\hat{v}_d - r_s\hat{i}_d + \omega_e L_q \hat{i}_q}{\hat{v}_q - r_s\hat{i}_q - \omega_e L_q \hat{i}_d}\right);$$

the actual current value is represented as:

$$\begin{bmatrix} i_d \\ i_q \end{bmatrix} = \begin{bmatrix} \cos\tilde{\theta}_e & -\sin\tilde{\theta}_e \\ \sin\tilde{\theta}_e & \cos\tilde{\theta}_e \end{bmatrix} \begin{bmatrix} \hat{i}_d \\ \hat{i}_q \end{bmatrix};$$

and
the load torque estimation value is represented as:

$$T_e = \frac{3}{2}\frac{P}{2}i_q[\lambda'_m + (L_d - L_q)i_d];$$

wherein $\hat{v}_d$ is an estimation direct axis (d-axis) voltage value in reference with the estimation coordinate axis, $\hat{v}_q$ is an estimation quadrature axis (q-axis) voltage value in reference with the estimation coordinate axis, $\hat{i}_d$ is an estimation d-axis current value in reference with the estimation coordinate axis, $\hat{i}_q$ is an estimation q-axis current value in reference with the estimation coordinate axis, $L_d$ is a d-axis inductance of the motor, $L_q$ is a q-axis inductance of the motor, $\lambda'_m$ is an equivalent magnetic flux from a rotor to a stator of the motor, and P is a pole number of the motor.

2. The motor driving method according to claim 1, further comprising:
setting one of the estimation d-axis voltage value and the estimation q-axis voltage value to be zero by the controller; and
setting the other one of the estimation d-axis voltage value and the estimation q-axis voltage value by the controller, for obtaining the estimation d-axis current value and the estimation q-axis current value.

3. The motor driving method according to claim 1, further comprising:
adjusting the estimation q-axis voltage value and the estimation d-axis voltage value to achieve that one of the estimation q-axis current value and the estimation d-axis current value equals to zero.

4. The motor driving method according to claim 1, wherein the motor is a surface permanent magnet (SPM) motor, and a the d-axis inductance equals to the q-axis inductance, a relationship between the angle difference, the estimation d-axis voltage value and the estimation d-axis current value is represented as:

$$\sin\theta_e = \frac{\hat{v}_d - r_s \hat{i}_d}{\omega \lambda'_m},$$

and the actual q-axis current value is represented as:

$$i_q = \hat{i}_d \times \frac{\hat{v}_d - r_s \hat{i}_d}{\omega \lambda'_m}.$$

5. The motor driving method according to claim 1, wherein the at least one electrical parameter comprises a combination of an angular velocity value $\omega_e$, a rotor coil wire resistance $r_s$ and the q-axis inductance $L_q$, or a combination of the angular velocity value $\omega_e$, the rotor coil wire resistance $r_s$, the d-axis inductance $L_d$ and the equivalent magnetic flux $\lambda'_m$ from the rotor to the stator of the motor.

6. The motor driving method according to claim 1, further comprising:
before switching from the open loop phase to the close loop phase, determining whether a speed command transmitted to the motor exceeds a speed command threshold value by the controller, wherein the speed command threshold value is 5% to 10% of a rated rotational speed of the motor.

7. The motor driving method according to claim 1, wherein the steps of calculating the angle difference and calculating the actual current value are performed repeatedly for obtaining a plurality of actual current values, and the motor driving method further comprises:
calculating the load torque estimation value according to an average of the plurality of actual current values obtained in an estimation period.

8. The motor driving method according to claim 7, wherein the estimation period is determined based on a time interval required by a speed command of the motor to reach a speed value, the speed value is 1% to 10% of a rated rotational speed of the motor.

9. The motor driving method according to claim 7, further comprising:
calculating the load torque estimation value according to the actual current value obtained at an endpoint of the estimation period.

10. The motor driving method according to claim 1, wherein, at the open loop phase, the motor is affected by a step load or an impact load, and the motor driving method further comprises:
compensating the output torque of the motor in reference with the load torque estimation value and the step load or the impact load.

11. A motor driving system, suitable for controlling a motor, the motor driving system comprising:
a voltage detector configured to receive and detect voltage values feedback from the motor;
a plurality of current detectors configured to receive and detect current values feedback from the motor;
a controller, configured to:
at an open loop phase and in response to a motor being operated under a steady-state, calculate an angle difference between an estimation coordinate axis of the motor and an actual coordinate axis, according to an estimation voltage value, an estimation current value and at least one electrical parameter feedback from the motor and in reference with the estimation coordinate axis of the motor;
calculate an actual current value in reference with the actual coordinate axis according to the angle difference;
calculate a load torque estimation value associated with the motor according to the actual current value; and
in response to the open loop phase being switched to a close loop phase, compensating an output torque of the motor according to the load torque estimation value,
wherein the angle difference is represented as:

$$\hat{\theta}_e = \tan^{-1}\left(\frac{\hat{v}_d - r_s \hat{i}_q + \omega_e L_q \hat{i}_q}{\hat{v}_q - r_s \hat{i}_q - \omega_e L_q \hat{i}_d}\right);$$

the actual current value is represented as:

$$\begin{bmatrix} i_d \\ i_q \end{bmatrix} = \begin{bmatrix} \cos\hat{\theta}_e & -\sin\hat{\theta}_e \\ \sin\hat{\theta}_e & \cos\hat{\theta}_e \end{bmatrix} \begin{bmatrix} \hat{i}_d \\ \hat{i}_q \end{bmatrix};$$

and
the load torque estimation value is represented as:

$$T_e = \frac{3}{2}\frac{P}{2}i_q[\lambda'_m + (L_d - L_q)i_d];$$

wherein $\hat{v}_d$ is an estimation direct axis (d-axis) voltage value in reference with the estimation coordinate axis, $\hat{v}_q$ is an estimation quadrature axis (q-axis) voltage value in reference with the estimation coordinate axis, $\hat{i}_d$ is an estimation d-axis current value in reference with the estimation coordinate axis, $\hat{i}_q$ is an estimation q-axis current value in reference with the estimation coordinate axis, $L_d$ is a d-axis inductance of the motor, $L_q$ is a q-axis inductance of the motor, $\lambda'_m$ is an equivalent magnetic flux from a rotor to a stator of the motor, and P is a pole number of the motor.

12. The motor driving system according to claim 11, wherein the controller is further configured to:
set one of the estimation d-axis voltage value and the estimation q-axis voltage value to be zero; and
set the other one of the estimation d-axis voltage value and the estimation q-axis voltage value, for obtaining the estimation d-axis current value and the estimation q-axis current value.

13. The motor driving system according to claim 11, wherein the controller is further configured to:
adjust the estimation q-axis voltage value and the estimation d-axis voltage value to achieve that one of the estimation q-axis current value and the estimation d-axis current value equals to zero.

14. The motor driving system according to claim 11, wherein wherein the motor is a surface permanent magnet (SPM) motor, and the d-axis inductance equals to the q-axis inductance, a relationship between the angle difference, the estimation d-axis voltage value and the estimation d-axis current value is represented as:

$$\sin\hat{\theta}_e = \frac{\hat{v}_d - r_s \hat{i}_d}{\omega \lambda'_m},$$

and the actual q-axis current value is represented as:

$$i_q = \hat{i}_d \times \frac{\hat{v}_d - r_s \hat{i}_d}{\omega \lambda'_m}.$$

15. The motor driving system according to claim 11, wherein the at least one electrical parameter comprises a combination of an angular velocity value $\omega_e$, a rotor coil wire resistance $r_s$ and the q-axis inductance $L_q$, or a combination of the angular velocity value $\omega_e$, the rotor coil wire resistance $r_s$, the d-axis inductance $L_d$, and the equivalent magnetic flux $\lambda'_m$ from the rotor to the stator of the motor.

16. The motor driving system according to claim 11, wherein the controller is further configured to:

before switching from the open loop phase to the close loop phase, determining whether a speed command transmitted to the motor exceeds a speed command threshold value by the controller, wherein the speed command threshold value is 5% to 10% of a rated rotational speed of the motor.

17. The motor driving system according to claim 11, wherein the controller calculates the angle difference and calculates the actual current value repeatedly for obtaining a plurality of actual current values, and the controller calculates the load torque estimation value according to an average of the plurality of actual current values obtained in an estimation period.

18. The motor driving system according to claim 17, wherein the estimation period is determined based on a time interval required by a speed command of the motor to reach a speed value, the speed value is 1% to 10% of a rated rotational speed of the motor.

\* \* \* \* \*